Oct. 17, 1950      C. W. JOHNSTON      2,525,803
FASTENING DEVICE
Filed Sept. 3, 1947
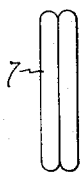
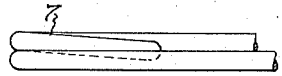
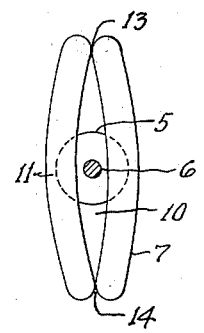
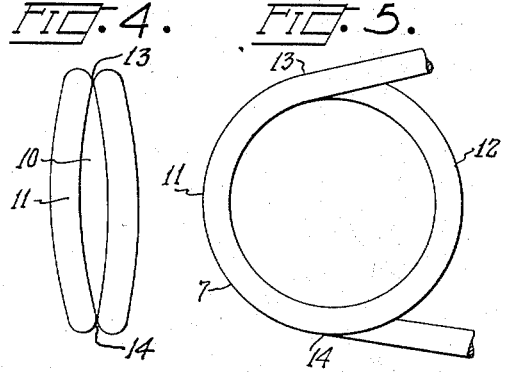
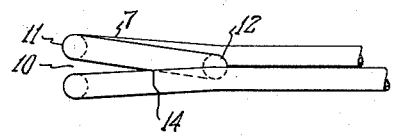
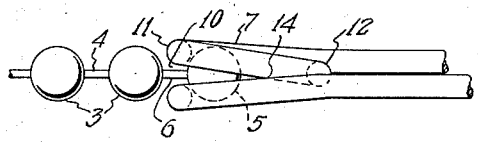
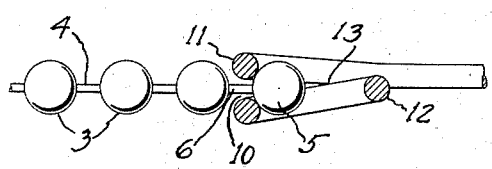
INVENTOR
CLARENCE W. JOHNSTON
BY Cook and Schermerhorn
ATTORNEYS Patented Oct. 17, 1950

2,525,803

UNITED STATES PATENT OFFICE 2,525,803

FASTENING DEVICE

Clarence W. Johnston, Portland, Oreg.

Application September 3, 1947, Serial No. 771,946

1 Claim. (Cl. 24—155)

This invention relates to improvements in a safety pin device of the type illustrated in the patent to Wallace No. 2,220,592, issued November 5, 1940 and assigned to the present applicant.

The safety pin device above referred to, with which the present invention is concerned, comprises a pair of safety pins attached to the opposite ends of a length of swivel ball chain. The safety pins have the usual spring loops of wire having two ends, one end of which comprises the point of the pin and the other end of which has a guard affixed thereto for engaging the point of the pin when the pin is closed. In the safety pin itself, the function of the spring loop of wire is to hold the point of the pin in firm engagement with the guard when the pin is closed and to cause the pin to spring to an open position when the point is released from the guard element. These spring loops in the safety pins are utilized to retain the end balls of the ball chain for attaching the pins to the ends of the chain.

In the patented construction referred to, one end ball of the ball chain is frictionally gripped in the loop of each of the safety pins by the spring action of the return bends so that the said end balls are held in substantially fixed positions in the spring loops, without any modification of the conventional safety pin. In assembling the patented device, the end ball is inserted in the spring loop by forcing the connecting link on the end ball between adjacent convolutions of the spring loop and then sliding the connecting link and end ball in a circular path around the spring loop until the end ball becomes positioned within the center of the loop with its connecting link projecting away from the center of the loop. The spring loop in a conventional safety pin of the type referred to consists of approximately one and one-half turns of the wire of which the pin is made, resulting in two adjacent convolutions of the wire on the outside of the spring loop at the end of the pin. These two convolutions are normally in tight contact with each other and so when the ball and connecting link are inserted in the manner described these convolutions are forced apart by the connecting link, causing the latter to be frictionally gripped and tightly held in a fixed position therebetween. The gripping action of the adjacent convolutions is the same at different points therearound so that if the connecting link works away from its intended central position, it remains in its new position without any tendency to slip back and centralize itself.

This characteristic constitutes a shortcoming in the original patented construction inasmuch as the connecting link on the end ball sometimes gradually works around to a side position, permitting it to release itself from the spring loop and thereby detach the safety pin from the chain. In other words, the gripping action is effective to maintain the connection as long as the position of the end link is not disturbed but if it is pulled around to a side position in use it is likely to slip out of the spring loop of the safety pin.

Another shortcoming of the original patented construction is a tendency for the convolutions of the spring loops of the safety pin to become entirely separated or spread apart by careless or improper assembling so that the end connecting link on the chain is not gripped at all, but is free to slide out and become detached from the safety pin. This results from accidentally deforming the spring loops so that they are not in substantial mutual contact at any point, leaving an open space therebetween which offers no restraint to positively confine the connecting link between the spring loops.

The object of the present invention is to provide means for centering the end connecting link in its proper position in the spring loop so that the chain will not become unintentionally detached from the pin. In particular, the object of the present invention is to deform the spring loop in such a manner that the connecting link for the end ball will be held loosely in an end position in the loop and so that considerable frictional resistance must be overcome to move the connecting link out of such position to disengage it from the spring loop. A specific object is to deform the spring loop by separating the adjacent convolutions on one side of the spring loop at the end of the pin while maintaining the convolutions in tight contact on either side of the point of separation so that a chain connecting link disposed between the separated portions of the convolutions will tend to remain in that position and will resist any tendency to work around the loop to become disengaged from the pin unless it is intentionally forced past the point where the convolutions are in tight engagement with each other.

These and other objects of the invention will be more clearly understood from the following description with reference to the accompanying drawings illustrating a preferred embodiment of the invention. It is to be understood, however, that the drawings are referred to merely for the purpose of illustrating the principles of the invention and not for the purpose of limiting the invention, the same being limited only by the scope of the appended claim.

In the drawings:

Figure 1 is a view of the complete device showing two safety pins attached to the opposite ends of a swivel ball chain;

Figure 2 is an end view of a safety pin showing the normal position of the two convolutions of the spring loop before deformation;

Figure 3 is a side view of the safety pin shown in Figure 2;

Figure 4 is a view taken similar to Figure 2 showing how the convolutions of the spring loop are deformed and separated to provide a space therebetween to receive the end connecting link of the chain in accordance with the teachings of the invention;

Figure 5 is a top plan view of the spring loop shown in Figure 4;

Figure 6 is a side view of the spring loop shown in Figure 4;

Figure 7 is a view similar to Figure 4 but taken on the line 7—7 of Figure 1 and showing the manner in which the end of the chain is received in the spring loop of the safety pin;

Figure 8 is a side view of the arrangement shown in Figure 7; and

Figure 9 is a sectional view of the same arrangement taken on the line 9—9 of Figure 1.

The complete device as shown in Figure 1 comprises a swivel ball chain 1 having a safety pin 2 attached to each end thereof. The chain 1 preferably comprises a series of hollow balls or spherical shells 3 joined by connecting links 4 extending through holes in the balls 3 and having enlarged heads to permit them to swivel in the balls without pulling out of the holes. This construction is shown on an enlarged scale in Figures 8 and 9 where the end ball is designated by the numeral 5 and the connecting link for the end ball is designated by the numeral 6. Other forms of chain may be used but it is necessary that the chain have an enlarged head comparable to the ball 5 on each end thereof and a reduced or flattened shank comparable to the link 6 connecting this head with the rest of the chain in order that these parts may be applied to the spring loop of a conventional safety pin.

Figures 2 and 3 illustrate conventional safety pin construction. The spring loop designated generally by the numeral 7 comprises approximately one and one-half turns of the wire of which the pin is made, these turns or convolutions lying tight and flat against each other in the manner shown. In making one and one-half turns in this manner, the wire of the pin presents two adjacent convolutions on the side of the spring loop at the end of the pin, as shown in Figure 2, while there is only a single convolution of the spring wire on the other side of the loop between the two free ends of the wire. It is apparent that when the end link 6 is forced around between the convolutions of the spring loop 7 to position the end ball 5 in the eye of an undeformed loop to assemble the device in its prior form, the convolutions must be forced apart by the link 6 as it is moved therearound in the manner of forcing a key on a split key ring and that the link 6 will, therefore, remain equally well in any position around the loop. If the link works around gradually in use to one side or the other of the spring loop, it is apparent that a slight pull producing further movement in the proper direction will then completely disengage the chain from the safety pin.

Figure 4 and 6 illustrate the manner in which the spring loop 7 is deformed or modified according to the present invention to improve the connection between the chain and the safety pin. Prior to insertion of the end ball 5 and end link 6 into the spring loop 7 the latter is deformed by spreading it apart with a permanent set to form a gap or space 10 on the side of the spring loop designated at 11 which is the side having the two convolutions at the extremity of the safety pin. The other side of the spring loop having a single convolution and being on the side of the loop which is directed interiorly of the safety pin is designated by the numeral 12 in Figure 5. The bending or deformation which is applied to the wire in the spring loop to form the opening 10 does not extend around the spring loop to separate the two convolutions at all points but is restricted to a relatively short length of the wire on the side 11 to leave the two convolutions in firm contact at points 13 and 14 on the opposite sides of the spring loop where the two legs of the spring wire are tangent to the loop 7. The opening 10 preferably has a width between the wires sufficient to receive the end link 6 loosely, and preferably the link 6 is of such length and balls 3 and 5 are of such size that none of these parts of the chain will be pinched in the opening 10.

The relationship between these parts is best shown in Figures 7 to 9. If the chain is pulled to one side of the pin in use the link 6 is free to move to some extent in the opening 10 without separating the convolutions at the points 13 and 14 to release the chain, but if the convolutions should become forced apart slightly at these points by tension on the chain the converging surfaces will cam the link back to its end position in the opening 10 when the chain is relaxed.

There is little possibility of the chain becoming accidentally detached from the pin because it cannot gradually work around to release itself as in the prior construction. On the contrary, whenever the chain is relaxed it will work itself back away from a side position and toward an end position in the spring loop of the pin. This constitutes an important safety feature when the device is applied to infants' apparel by preventing loose pins about the infant which might be picked up and swallowed if they should become unfastened from the clothing.

The present invention is not concerned with the method of deforming the safety pin nor the method of assembling the device, which functions may be accomplished in different ways.

Having now described my invention and in what manner the same may be used, what I claim as new and desire to protect by Letters Patent is:

In a fastening device, a spring loop safety pin having adjacent convolutions in the spring loop, and a swivel ball chain having a series of balls and rigid interconnecting links, an end ball of said chain being disposed in said spring loop with its connecting link extending between adjacent convolutions of said loop, said convolutions being in mutual contact at points on opposite sides of said loop and being deformed and bent apart in a portion of said loop at the end of the safety pin between said points of contact, said link being retained relatively loosely in said end portion of the loop by said points of contact to prevent said link from unintentionally passing between said points of contact and becoming disengaged from the pin.

CLARENCE W. JOHNSTON.

REFERENCES CITED

The following references are of record in the file of this patent:

UNITED STATES PATENTS

| Number | Name | Date |
| --- | --- | --- |
| 1,082,075 | Fitzgerald | Dec. 23, 1913 |
| 1,858,787 | Ottenheimer | May 17, 1932 |
| 2,220,592 | Wallace | Nov. 5, 1940 |